(No Model.)
J. F. SEIBERLING.
RUBBER TIRED VEHICLE WHEEL.
No. 580,164. Patented Apr. 6, 1897.
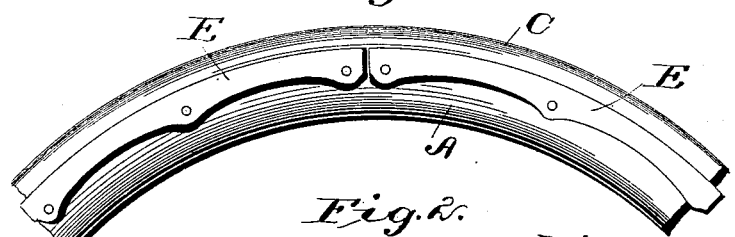
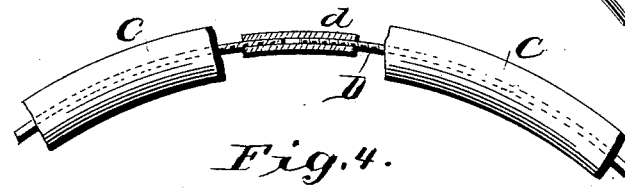
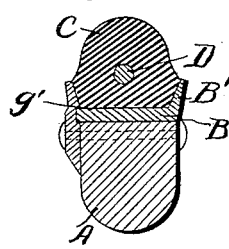
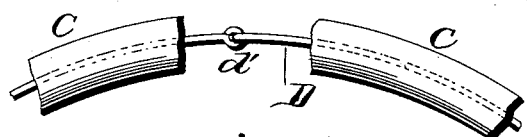
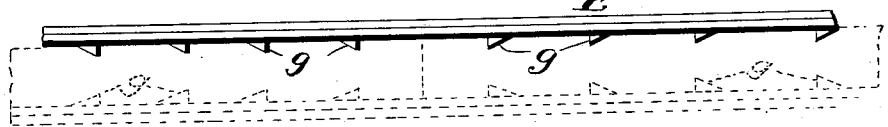
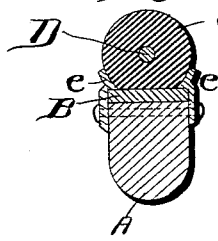  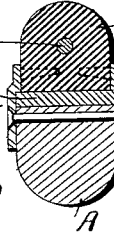 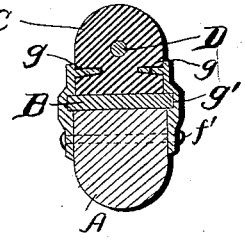
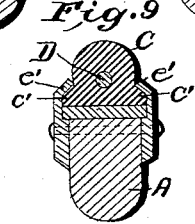
Witnesses
A. B. Diggs
Chas. J. Gooch
Inventor
John F. Seiberling
By A. M. Smith & Son,
Attorneys.
THE NORRIS PETERS CO., PHOTO-LITHO., WASHINGTON, D. C.

UNITED STATES PATENT OFFICE.

JOHN F. SEIBERLING, OF AKRON, OHIO.

RUBBER-TIRED VEHICLE-WHEEL.

SPECIFICATION forming part of Letters Patent No. 580,164, dated April 6, 1897.

Application filed June 5, 1896. Serial No. 594,431. (No model.)

*To all whom it may concern:*

Be it known that I, JOHN F. SEIBERLING, a citizen of the United States, and a resident of Akron, in the county of Summit and State of Ohio, have invented a new and useful Improvement in Rubber-Tired Vehicle-Wheels, of which the following is a full, clear, and exact description, reference being had to the accompanying drawings, making part of this specification.

The invention relates to means for securing rubber or cushion tires to the wheels of vehicles of ordinary construction, such as are usually constructed with a rim composed of wooden fellies and a flat metal tire; and it consists in the combination, with the rim of a wheel of the character indicated, of a rubber tire applied to the outer face of said metallic tire or rim and provided with a non-extensible core and clamping segments or rings bolted to the wheel-rim, and in certain modifications and details of construction, all as hereinafter described and claimed.

In the accompanying drawings, Figure 1 represents in side elevation a portion of a wheel-rim and rubber tire with clamping-ring segments applied. Fig. 2 is a similar view showing as a modification a broken section of a clamping-ring. Figs. 3 and 4 are side elevations of portions of the rubber tire broken away to show different means for uniting the ends of the metallic core. Figs. 5, 6, 7, 8, 9, and 11 show sections through the rim, metal tire, and rubber tire and the segments or rings for clamping the rubber tire in place, different forms of rubber tire with clamping-segments to match being illustrated; and Fig. 10 is a top or edge view showing teeth formed on the inner face of a clamping segment or ring adjacent to the junction of the ends of the rubber tire.

A indicates the usual wooden rim of a vehicle-wheel, and B the metal tire therefor, said parts being of the usual or any preferred construction.

C indicates a rubber or cushion tire, which may be of any usual or preferred form in cross-section, as indicated in Figs. 5 to 9, inclusive, and having a central bore through which a non-extensible core D extends, the ends of which are connected for drawing the rubber tire tightly down upon the outer face of the metal tire B by means of an elongated nut or sleeve *d*, (see Fig. 3,) having right and left hand screw-threads formed in its opposite ends, the ends of the wire core being correspondingly screw-threaded to match said nut, thus adapting the ends of the wire core to be drawn toward each other for causing the rubber tire to snugly hug the rim or metal tire of the wheel.

In Fig. 4 eyes or a hook and eye (indicated at *d'*) are shown for joining the ends of the wire core, and other forms of joint may be employed, preferably such as can be adjusted for the purpose indicated. With the hook and eye, the eye being formed at one end of the wire the other end can be drawn through said eye until the rubber tire is drawn snugly over the wheel-rim and its ends brought together, when said end can be bent or twisted into hook or eye form and all surplus metal removed. Other forms of core may be used, if preferred.

The rubber tire thus applied to the rim of the wheel is secured against lateral displacement by means of clamping segments or rings, the former indicated at E, Fig. 1, and the latter (broken away) at E', Fig. 2. The form of these segments in cross-section is varied to conform to the shape of the rubber tire employed. Thus in Fig. 5 a nearly-round tire is shown, flat only on the face resting in contact with the metal tire. In this case inwardly-projecting lips *e* are formed on the segments, said lips extending inward, in contact with the outer face of the metal tire, to the flattened face of the rubber tire, and being made concave on their outer faces form partial seats for the tire at the sides of said flattened face.

In Fig. 6, showing a round tire, the lips *e* are extended farther inward, so that they nearly meet, and the entire seat, or nearly so, for the rubber tire is provided by their concave outer faces, as shown.

In Figs. 7, 8, and 9 the rubber tire is flat on its inner face and rounded on its outer or wearing face or tread. In these, as in the others, the segments are recessed or grooved at *g'* on their inner faces to stride the metal tire B, as shown, to prevent the latter from interfering with their grasping the rubber tire snugly between them, and in Fig. 9, where the rounded wearing-surface of the rubber tire is reduced in size, forming shoulders $c'$ on the sides, the segments are provided with inturned inclined lips $e'$ on their outer edges, said lips overlying the shoulders $c'$ and serving not only to clamp the rubber tire between the opposing segments and so prevent its lateral displacement, but to draw it snugly down on the metallic tire or wheel-rim. In this last construction the wire core can be dispensed with if desired.

The segments or rings formed as described are connected and drawn toward each other for clamping the rubber tire between them by means of through-bolts $f$, passing through the wooden rim of the wheel. The heads of these bolts and the nuts for securing them can be countersunk in the segments to avoid objectionable projections on the sides of the rim, such as would be liable to catch and throw up dirt or mud.

The segments at the point where they stride the junction of the ends of the rubber tire are provided with inwardly-projecting teeth $g$, which are pointed or brought to an edge, adapting them to indent and engage the rubber ends on both sides of the rubber and joint therein, and thereby prevent said ends from "creeping" or being drawn apart.

With the aid of the removable segments or rings and with the rubber tire constructed as described it will readily be seen that the rubber tire and its non-extensible core can be cut or prepared of the exact length to snugly fit over the metal tire of the wheel, and being thus prepared can be slipped over the same—a manner of applying that would be impracticable if the ordinary double-flanged rim were employed, as the non-extensible core would prevent the rubber tire from passing over the flange of such a rim. After the rubber tire has been placed in position the segments or rings are applied to the opposite sides of the rim and rubber tire, and being secured in place by through-bolts, as explained, serve to clamp said rubber tire snugly between them and so effectually prevent its lateral displacement.

By using the wire core, as explained, for binding the rubber tire to the wheel-rim the segments can be made much lighter and smoother than would otherwise be practicable, as the tendency to lateral displacement is greatly diminished. The segments are thereby rendered less liable to throw dirt.

Where the metal tire does not project beyond the wooden rim, the groove $g'$ in the segments is unnecessary.

In Fig. 11 the tire B is shown provided with a peripheral flange $B'$ formed on one side, the removable clamping segments or ring in such case being applied to the opposite side only of the rim and tire. This construction is preferred where the rim is to be newly tired, as reducing the cost of manufacture and repairs.

The teeth or spurs $g$ indent or penetrate the sides of the rubber tire and may be used throughout the entire extent of the clamping segments or rings for holding the rubber tire in place without the aid of the central core, in which case the central longitudinal perforation of said tire is rendered unnecessary and its cost of manufacture will thereby be materially reduced.

Having thus described the invention, what is claimed as new is—

1. The combination with a wheel-rim having a flat, metal tire, of the rubber tire, and the removable, clamping-segments or ring-flange for holding the rubber tire against lateral displacement, said segments or ring being provided with pointed teeth for indenting the sides of the rubber tire and preventing endwise movement thereof, substantially as described.

2. The combination with a wheel-rim having a metal tire, of a removable flange or ring, a rubber or cushion tire provided with a non-extensible core and held against lateral displacement by the rim-flanges, and pointed teeth on the flanges adapted to indent the rubber tire and prevent endwise movement or creeping of said tire, substantially as described.

In testimony whereof I have hereunto set my hand this 2d day of June, A. D. 1896.

JNO. F. SEIBERLING.

Witnesses:
W. H. CARTER,
J. A. BRADLEY.